(12) United States Patent
Ukai

(10) Patent No.: US 10,768,688 B2
(45) Date of Patent: Sep. 8, 2020

(54) ARITHMETIC PROCESSING DEVICE, INFORMATION PROCESSING APPARATUS, AND METHOD FOR CONTROLLING ARITHMETIC PROCESSING DEVICE

(71) Applicant: FUJITSU LIMITED, Kawasaki-shi, Kanagawa (JP)

(72) Inventor: Megumi Ukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 15/950,277

(22) Filed: Apr. 11, 2018

(65) Prior Publication Data
US 2018/0307299 A1    Oct. 25, 2018

(30) Foreign Application Priority Data

Apr. 19, 2017    (JP) ................. 2017-082580

(51) Int. Cl.
| | | |
|---|---|---|
| G06F 1/00 | (2006.01) | |
| G06F 1/3296 | (2019.01) | |
| G06F 1/3228 | (2019.01) | |
| G06F 13/00 | (2006.01) | |
| G06F 9/30 | (2018.01) | |
| H04L 29/08 | (2006.01) | |

(52) U.S. Cl.
CPC .......... *G06F 1/3296* (2013.01); *G06F 1/3228* (2013.01); *G06F 13/00* (2013.01); *G06F 9/3001* (2013.01); *H04L 67/10* (2013.01)

(58) Field of Classification Search
CPC ...... G06F 1/3296; G06F 13/00; G06F 1/3228; G06F 9/3001; H04L 67/10
See application file for complete search history.

(56) References Cited

U.S. PATENT DOCUMENTS

2008/0034242 A1* 2/2008 Ishikura ................ G06F 1/3203
                                                                   713/323
2013/0272708 A1* 10/2013 Mizuguchi ............. H04B 10/27
                                                                   398/71

FOREIGN PATENT DOCUMENTS

| JP | 2012-190283 | 10/2012 |
| JP | 2013-008198 | 1/2013 |

* cited by examiner

*Primary Examiner* — Xuxing Chen
(74) *Attorney, Agent, or Firm* — Fujitsu Patent Center (57) ABSTRACT

An arithmetic processing device includes: a communication interface configured to transmit a data request corresponding to a data request instruction stored in a data request queue that stores the data request instruction as an entry and to receive data corresponding to the transmitted data request; and a processor configured to perform an operation by using the data received by the communication interface, the processor is configured to cause the communication interface to transition to a power-saving state when the data request queue includes no entry and the processor performs the operation.

18 Claims, 9 Drawing Sheets

| CONDITION | LI TRANSITION CONDITION |
|---|---|
| 1 | DATA REQUEST QUEUE IS EMPTY |
| 2 | OPERATION INSTRUCTION QUEUE IS FULL |
| 3 | STATE REGISTER INDICATES THAT OPERATION IS BEING PERFORMED |

US 10,768,688 B2

ARITHMETIC PROCESSING DEVICE, INFORMATION PROCESSING APPARATUS, AND METHOD FOR CONTROLLING ARITHMETIC PROCESSING DEVICE

CROSS-REFERENCE TO RELATED APPLICATION

This application is based upon and claims the benefit of priority of the prior Japanese Patent Application No. 2017-82580, filed on Apr. 19, 2017, the entire contents of which are incorporated herein by reference.

FIELD

The embodiments discussed herein are related to an arithmetic processing device, an information processing apparatus, and a method for controlling an arithmetic processing device.

BACKGROUND

An image processing unit includes a bus transfer unit, a data storage unit, a determination unit, and a transfer control unit.

Related techniques are disclosed in Japanese Laid-open Patent Publication No. 2013-8198 or Japanese Laid-open Patent Publication No. 2012-190283.

SUMMARY

According to an aspect of the embodiments, an arithmetic processing device includes: a communication interface configured to transmit a data request corresponding to a data request instruction stored in a data request queue that stores the data request instruction as an entry and to receive data corresponding to the transmitted data request; and a processor configured to perform an operation by using the data received by the communication interface, the processor is configured to cause the communication interface to transition to a power-saving state when the data request queue includes no entry and the processor performs the operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, the bus transfer unit, coupled to a given transfer destination, shifts from the normal power state to the power-saving state when the situation where there is no data transfer to the transfer destination has continued for a given time period. Upon occurrence of a data transfer request in the power-saving state, the bus transfer unit returns from the power-saving state to the normal power state and transfers data requested to be transferred to the transfer destination. The data storage unit temporarily stores therein data requested to be transferred. The determination unit determines whether the data requested to be transferred is setting data for controlling operations of the transfer destination and whether the data requested to be transferred is given specific data. If the data requested to be transferred is setting data, the transfer control unit stores the data in the data storage unit. If the data requested to be transferred is data other than the setting data, or specific data, the transfer control unit sequentially transfers the data stored in the data storage unit to the bus transfer unit. Thereafter, the transfer control unit causes the data requested for transfer to be transferred, and, once the volume of data in the data storage unit reaches a predetermined level at which transfer is to start, causes the bus transfer unit to sequentially transfer all of the data stored in the data storage unit.

For example, an information processing apparatus processes data transferred from a data control apparatus. A request unit requests the data control apparatus to transfer data. An output unit processes the transferred data and sequentially outputs the processed data. A calculation unit calculates a first time from when transfer is completed until when the next transfer starts, based on an amount of transfer of data requested by the request unit and an output rate output by the output unit. A comparison unit compares the first time with a second time that is the sum of the time taken to cause an inter-chip bus coupling the data control apparatus and the information processing apparatus to each other to transition to the power-saving state and the time taken to cause the inter-chip bus to return from the power-saving time. When it is determined by the comparison unit that the first time is longer than the second time, a change unit causes the inter-chip bus to transition to the power saving state.

For example, when the situation where there is no transfer has continued for a given time period, shifting from the normal power state to the power-saving state occurs. While the situation where there is no transfer continues during the given time period, the inter-chip bus is in the normal power state and thus may consume power.

For example, a processing unit with reduced power consumption resulting from early transition to the power-saving state may be provided.

Figure 1:
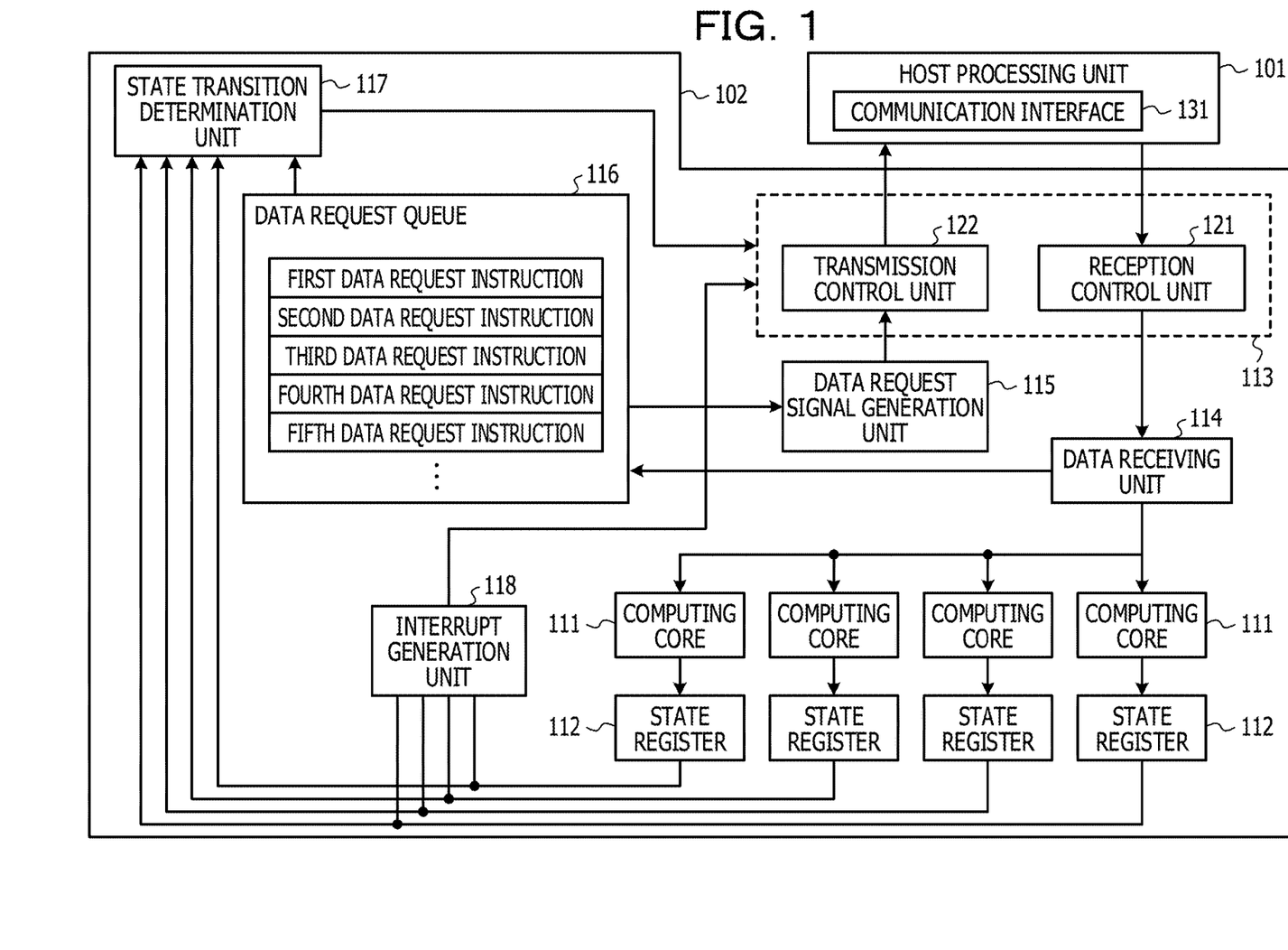
FIG. 1 illustrates an example of an information processing apparatus.

FIG. 1 illustrates an example of an information processing apparatus. The information processing apparatus includes a host processing unit 101 and a processing unit 102. The processing unit 102 is coupled to the host processing unit 101. The processing unit 102 may also be coupled via a switch to the host processing unit 101. The host processing unit 101, which is, for example, a central processing unit (CPU), includes a communication interface 131.

The processing unit 102 includes a plurality of computing cores (processing units) 111, a plurality of state registers 112, a communication interface 113, a data receiving unit 114, a data request signal generation unit 115, a data request queue 116, a state transition determination unit 117, and an interrupt generation unit 118. The communication interface 113 includes a reception control unit 121 and a transmission control unit 122.

The communication interface 113, which is, for example, a peripheral component interface express (PCI Express) communication interface, includes a transaction layer, a data link layer, and a physical layer and performs data communication with the host processing unit 101. The communication interface 131 of the host processing unit 101 is similar to the communication interface 131 of the processing unit 102.

The communication interface 113, at the physical layer, generates an ordered set to be transmitted and received to and from the communication interface 131 of the host processing unit 101 in order to perform connection training. The communication interface 113 also, at the transaction layer, packetizes data to be transmitted to the host processing unit 101 into packets. The communication interface 113 also, at the data link layer, packetizes credit information for transmission and reception to and from the host processing unit 101 and acknowledgements for guaranteeing transmission of data packets. The communication interface 113 is managed by a state machine at the physical layer.

Figure 2A:
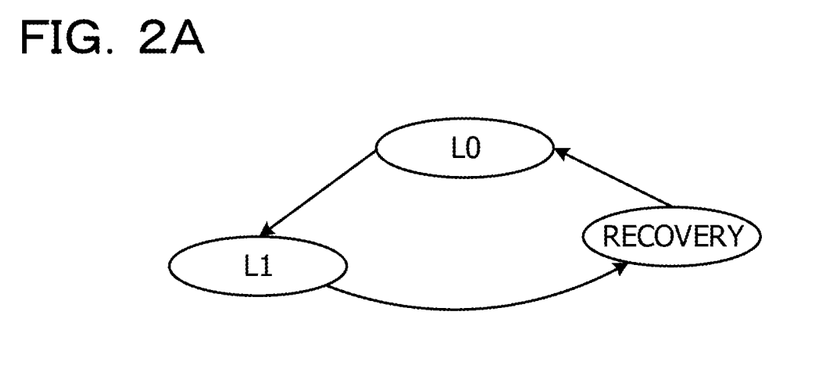
FIG. 2A illustrates an example of a state machine of the physical layer of a communication interface.

FIG. 2A illustrates an example of a state machine of the physical layer of the communication interface 113. The state machine of the physical layer of the communication interface 113 includes a normal state L0, a power-saving state L1, and a recovery state. In the normal state L0, the communication interface 113 has a normal power consumption and is capable of performing transmission and reception to and from the host processing unit 101. In the power-saving state L1, the communication interface 113 is in an electrically idle state, has low power consumption, and is incapable of performing transmission and reception to and from the host processing unit 101.

When, in the normal state L0, having entered a state of not performing communication, the communication interface 113 transitions to the power saving state L1, thereby making it possible to reduce power consumption. When, in the power-saving state L1, having to perform communication, the communication interface 113 transitions via the recovery state to the normal state L0. In the recovery state, the communication interface 113 performs communication connection training by transmitting and receiving an ordered set to and from the communication interface 131 of the host processing unit 101, and then transitions to the normal state L0. In the normal state L0, the communication interface 113 performs transmission and reception to and from the host processing unit 101.

Figure 2B:
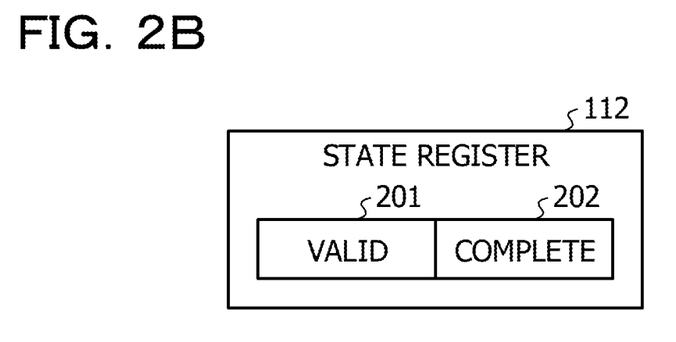
FIG. 2B illustrates an example of a configuration of a state register.

FIG. 2B illustrates an example of a configuration of a state register. In FIG. 2B, a configuration example of the state register 112 in FIG. 1 is illustrated. The state register 112, including a valid bit 201 and a complete bit 202, stores therein the state of the computing core 111. The valid bit 201 indicates whether an operation of the computing core 111 is being performed. The complete bit 202 indicates whether an operation of the computing core 111 has been performed. When the computing core 111 is in the idle state where an operation is not performed, the valid bit 201 and the complete bit 202 are both zero. When the computing core 111 is performing an operation, the valid bit 201 is one and the complete bit 202 is zero. When the computing core 111 has performed an operation, the valid bit 201 and the complete bit 202 are both one.

The state register 112 is not limited to the bit configuration mentioned above. The state register 112 may express four states, the idle state, the state where an operation is being performed, the state where an operation has been performed normally, and the state where an operation has been performed abnormally, as two bits.

For example, the physical layer of the communication interface 131 is in the normal state L0, and the state register 112 is such that the valid bit 201 and the complete bit 202 are both zero.

The host processing unit 101 transmits packets of a data request instruction to the reception control unit 121 of the processing unit 102 by way of the communication interface 131. The reception control unit 121 receives the data request instruction packets transmitted by the host processing unit 101 and outputs a signal of the data request instruction to the data receiving unit 114. The data receiving unit 114 receives the data request instruction signal output by the reception control unit 121 and stores the data request instruction as an entry of the data request queue 116. The data request instruction includes the type of an operation to be performed on the data, and information about the computing core 111 that performs the operation.

In a similar manner, the host processing unit 101 may sequentially transmit a plurality of data request instruction packets. The data receiving unit 114 sequentially stores the data request instructions as a plurality of entries of the data request queue 116 in accordance with the data request instruction packets received by the reception control unit 121. The data request queue 116 stores the data request instructions in a first-in first-out manner.

The data request signal generation unit 115 reads a data request instruction as the entry at the head of the data request queue 116 and outputs a signal of the data request to the transmission control unit 122. The transmission control unit 122 packetizes the data request signal output by the data request signal generation unit 115 into packets and transmits the packets of the data request to the host processing unit 101.

The host processing unit 101, by way of the communication interface 131, receives the data request packets transmitted by the transmission control unit 122 and transmits packets of data corresponding to the received data request packets to the reception control unit 121 of the processing unit 102.

The reception control unit 121 receives the data packets transmitted by the host processing unit 101 and outputs the data to the data receiving unit 114. In accordance with the data request instruction mentioned above, the data receiving unit 114 outputs the data output by the reception control unit 121 to one or a plurality of computing cores 111. The computing core 111 receives data from the data receiving unit 114 and prepares for an operation.

The data receiving unit 114 deletes a data request instruction corresponding to the received data mentioned above from the data request queue 116. Then, the transmission control unit 122 transmits packets of a data request completion notification corresponding to the data request instruction to the host processing unit 101.

Upon receiving the packets of the data request completion notification from the transmission control unit 122 by way of the communication interface 131, the host processing unit 101 transmits packets of an operation instruction corresponding to the data request completion notification to the reception control unit 121 of the processing unit 102.

Figure 3:
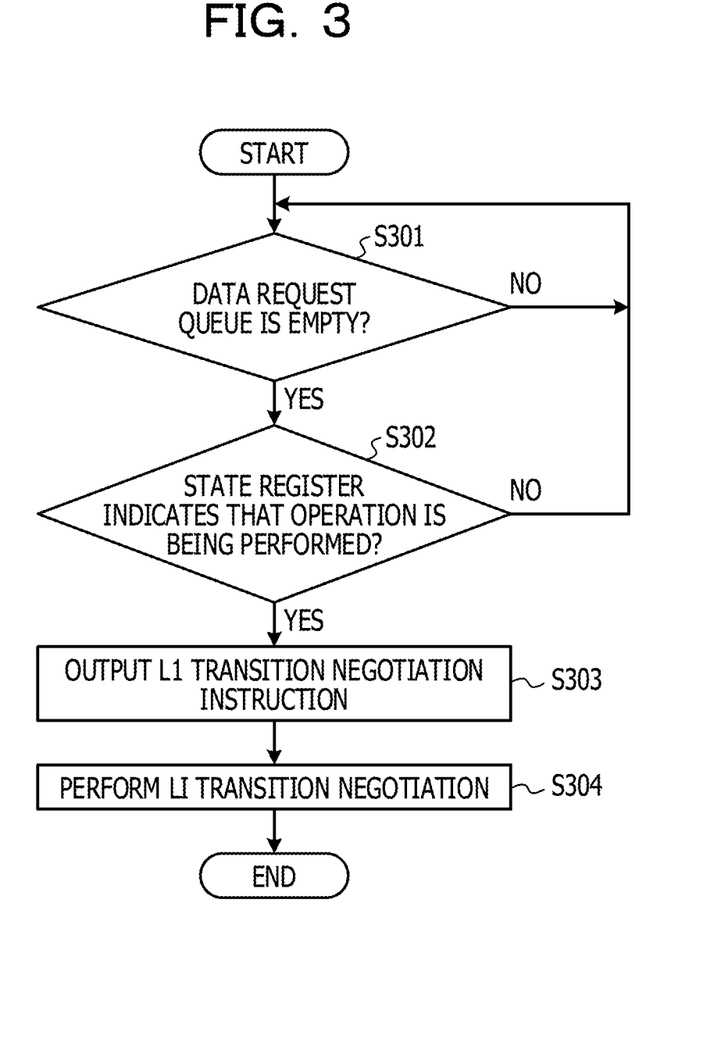
FIG. 3 illustrates an example of a method for controlling a processing unit.

The reception control unit 121 receives the operation instruction packets from the host processing unit 101 and outputs a signal of the operation instruction to the data receiving unit 114. The data receiving unit 114 receives the operation instruction signal output by the reception control unit 121 and outputs the operation instruction to the computing core 111 corresponding to the operation of the operation instruction. Upon receiving the operation instruction, the computing core 111 starts performing an operation by using the received data mentioned above. In addition, upon starting performing the operation, the computing core 111 sets the valid bit 201 of the state register 112 corresponding to itself to one. With reference to FIG. 3, a method for controlling the processing unit 102 will be described below.

FIG. 3 illustrates an example of a method for controlling a processing unit. In operation S301, the state transition determination unit 117 determines whether there is no entry in the data request queue 116. When there is no entry in the data request queue 116, this implies that the processing unit 102 will not receive any packet of data corresponding to a data request instruction from the host processing unit 101 and there is no schedule for the processing unit 102 to be instructed to perform a new operation. If the state transition determination unit 117 determines that there is no entry in the data request queue 116, the process proceeds to operation S302. If the state transition determination unit 117 determines that there is any entry in the data request queue 116, the state transition determination unit 117 has to wait for the reception control unit 121 to receive packets of data and therefore maintains the normal state L0 of the physical layer of the communication interface 113, and the process returns to operation S301.

In operation S302, the state transition determination unit 117 refers to the state register 112 and determines whether at least one computing core 111 out of one or a plurality of computing cores 111 corresponding to the operation of the operation instruction mentioned above is performing the operation. In cases where a plurality of computing cores 111 perform operations in response to one operation instruction, all of the plurality of computing cores 111 not necessarily start performing the operations simultaneously. When at least one computing core 111 starts performing the operation, the reception control unit 121 has received packets of the operation instruction from the host processing unit 101 and the computing core or cores 111 start performing long-time operations. It is known that thereafter the processing unit 102 does not perform communication with the host processing unit 101. If communication is not performed, it is desirable that the physical layer of the communication interface 113 transitions from the normal state L0 to the power-saving state L1, suppressing the power consumption. If the state transition determination unit 117 determines that the at least one computing core 111 mentioned above is performing an operation, the process proceeds to operation S303. Otherwise, if the state transition determination unit 117 determines that no one of the computing cores 111 mentioned above is performing operations, the state transition determination unit 117 has to wait for the reception control unit 121 to receive packets of an operation instruction and therefore maintains the normal state L0 of the physical layer of the communication interface 113, and the process returns to operation S301.

Figure 4:
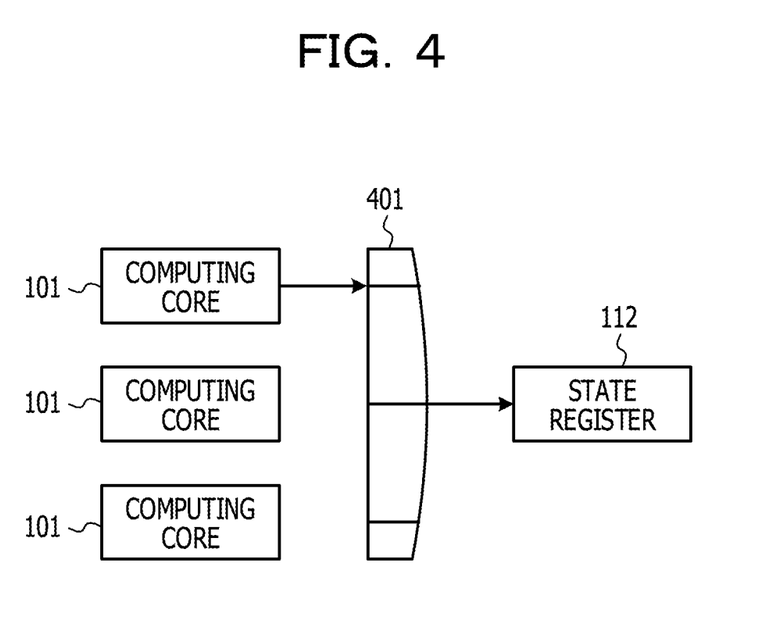
FIG. 4 illustrates an example of computing cores, an OR logical circuit, and a state register.

As illustrated in FIG. 4, one OR logic circuit 401 and one state register 112 may be provided for each computing group consisting of a plurality of computing cores 101 that perform operations in response to one operation instruction. When at least one computing core 101, out of the plurality of computing cores 101 that perform operations in response to one operation instruction, outputs a set signal for the valid flag 201 in association with the fact that the at least one computing core 101 starts performing the operation, the OR logic circuit 401 sets the valid flag of the state register 112 to one. In operation S302, the state transition determination unit 117 may refer to this state register 112 and determine whether at least one computing core 111 out of one or a plurality of computing cores 111 corresponding to the operation of the operation instruction mentioned above is performing the operation.

In operation S303, the state transition determination unit 117 outputs a power-saving state L1 transition negotiation instruction to the communication interface 113. The power-saving state L1 transition negotiation instruction is an instruction signal for causing the physical layer of the communication interface 113 from the normal state L0 to the power-saving state L1.

In operation S304, upon receiving the power-saving state L1 transition negotiation instruction output by the state transition determination unit 117, the transmission control unit 122 transmits packets of a power-saving state L1 transition negotiation to the communication interface 131 of the host processing unit 101. The host processing unit 101 determines whether the physical layer of the communication interface 131 may enter the power-saving state L1, depending on the necessity of communication. When communication is not scheduled, the host processing unit 101 determines that the physical layer of the communication interface 131 may enter the power-saving state L1, and, by way of the communication interface 131, transmits packets of a response for the power-saving state L1 transition negotiation to the communication interface 113 of the processing unit 102. Upon receiving the power-saving state L1 transition negotiation response packets transmitted by the host processing unit 101, the communication interface 113 causes the physical layer of the communication interface 113 to transition from the normal state L0 to the power-saving state L1. In a similar manner, the communication interface 131 causes the physical layer of the communication interface 131 to transition from the normal state L0 to the power-saving state L1.

Upon having performed an operation, the computing core 111 sets the completion bit 202 of the state register 112 corresponding to itself to one. When an operation corresponding to the operation instruction mentioned above is completed, the communication interface 113 has to transmit an operation completion notification to the host processing unit 101. For this purpose, the communication interface 113 has to cause the physical layer of the communication interface 113 to transition from the power-saving state L1 to the normal state L0.

Figure 5:
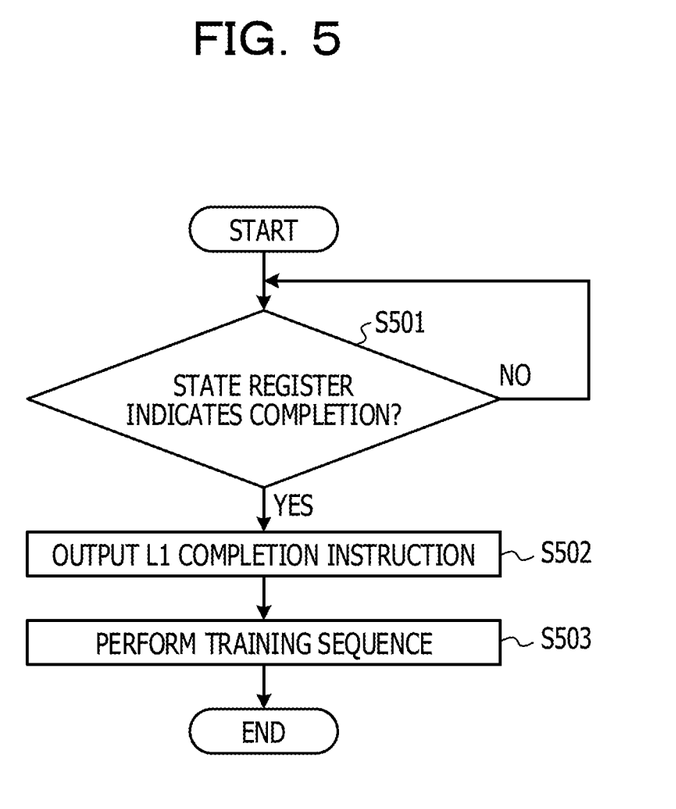
FIG. 5 illustrates an example of a method for controlling a processing unit.

FIG. 5 illustrates an example of a method for controlling a processing unit. In operation S501, the state transition determination unit 117 refers to the state register 112 and determines whether all of the operations of one or a plurality of computing cores 111 corresponding to the operation of the operation instruction mentioned above have been performed. When the plurality of computing cores 111 perform operations corresponding to one operation instruction, all of the plurality of computing cores 111 unnecessarily have performed operations simultaneously. If all of the operations of the plurality of computing cores 111 have been performed, the communication interface 113 may transmit an operation completion notification to the host processing unit 101. If the state transition determination unit 117 determines that all of the operations of the one or the plurality of computing cores 111 mentioned above have been performed, the process proceeds to operation S502. Otherwise, if the state transition determination unit 117 determines that all of the operations of the one or the plurality of computing cores 111 have not been performed, the state transition determination unit 117 has to wait for the operations to be completed and therefore maintains the power-saving state L1 of the physical layer of the communication interface 113, and the process returns to operation S501.

Figure 6:
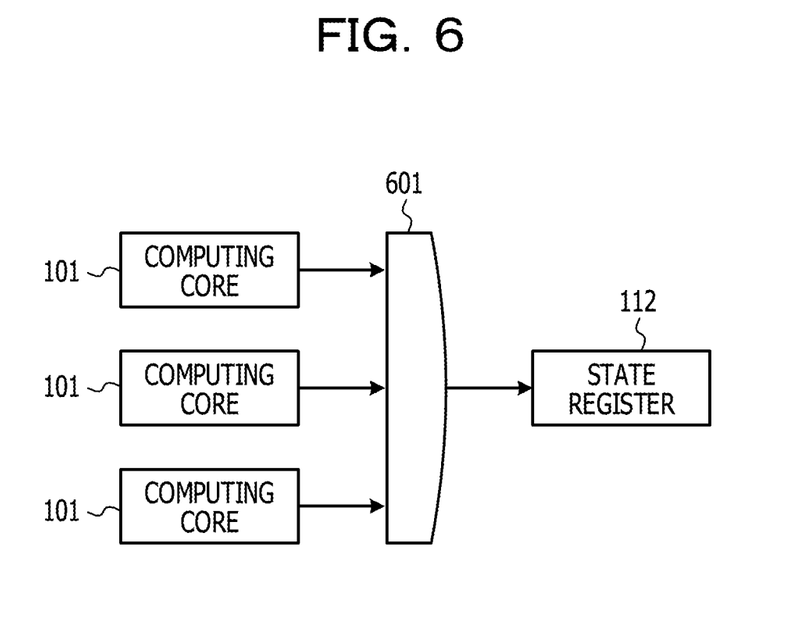
FIG. 6 illustrates an example of computing cores, an AND logical circuit, and a state register.

As illustrated in FIG. 6, one AND logic circuit 601 and one state register 112 may be provided for each computing group consisting of a plurality of computing cores 101 that perform operations in response to one operation instruction. When all of the plurality of computing cores 101 that perform operations in response to one operation instruction have output set signals for the completion flag 202 in association with the event that the operations have been performed, the AND logic circuit 601 sets the completion flag 201 of the state register 112 to one. In operation S501, the state transition determination unit 117 may refer to this state register 112 and determine whether all of the operations of one or a plurality of computing cores 111 corresponding to the operation of the operation instruction mentioned above have been performed.

In operation S502, the state transition determination unit 117 outputs a power-saving state L1 completion instruction to the communication interface 113. The power-saving state L1 completion instruction is an instruction signal for causing the physical layer of the communication interface 113 from the power-saving state L1 via the recovery state to the normal state L0.

In operation S503, upon receiving the power-saving state L1 completion instruction output by the state transition determination unit 117, the communication interface 113 causes the physical layer to transition from the power-saving state L1 to the recovery state. The transmission control unit 122 transmits an ordered set for connection training to the communication interface 131 of the host processing unit 101. Upon receiving the ordered set transmitted by the transmission control unit 122, the communication interface 131 of the host processing unit 101 causes the physical layer to transition from the power-saving state L1 to the recovery state and transmits the ordered set for connection training to the communication interface 113 of the processing unit 102. The transmission and reception of the ordered set mentioned above is repeated. Upon completion of the above connection training, the communication interfaces 113 and 131 cause the physical layer to transition from the recovery state to the normal state L0.

If the interrupt generation unit 118 refers to the state register 112 and determines that all of the operations of one or a plurality of computing cores 111 corresponding to the operation of the operation instruction mentioned above have been performed, the interrupt generation unit 118 then outputs an operation interrupt signal to the communication interface 113. Upon the operation completion interrupt signal received by the communication interface 113, the transmission control unit 122 transmits a packet of an operation completion notification to the communication interface 131 of the host processing unit 101 after the physical layer of the communication interface 131 has transitioned to the normal state L0.

Upon receiving the packet of the operation completion notification by way of the communication interface 131, the host processing unit 101 transmits a packet of an operation result request corresponding to the operation completion notification to the communication interface 113 of the processing unit 102. Upon the operation result request packet received by the communication interface 113, the transmission control unit 122 transmits a packet of data of an operation result of the computing core 111 corresponding to the operation result request to the communication interface 131 of the host processing unit 101.

As described above with reference to FIG. 3, if there is no entry in the data request queue 116 and at least one computing core 111, out of one or a plurality of computing cores 111 that perform operations in response to one operation instruction, is performing an operation, the state transition determination unit 117 outputs a power-saving state L1 transition negotiation instruction. Thus, when communication is not performed, the physical layers of the communication interfaces 113 and 131 shift from the normal state L0 to the power-saving state L1 at early stages, making it possible to reduce power consumption.

As described above with reference to FIG. 5, when all of the operations of one or a plurality of computing cores 111 that perform operations in response to one operation instruction have been performed, the state transition determination unit 117 outputs the power-saving state L1 completion instruction. Thus, the physical layers of the communication interfaces 113 and 131 shift from the power-saving state L1 via the recovery state to the normal state L0, thereby enabling communication of an operation completion notification packet and the like to be performed.

Figure 7:
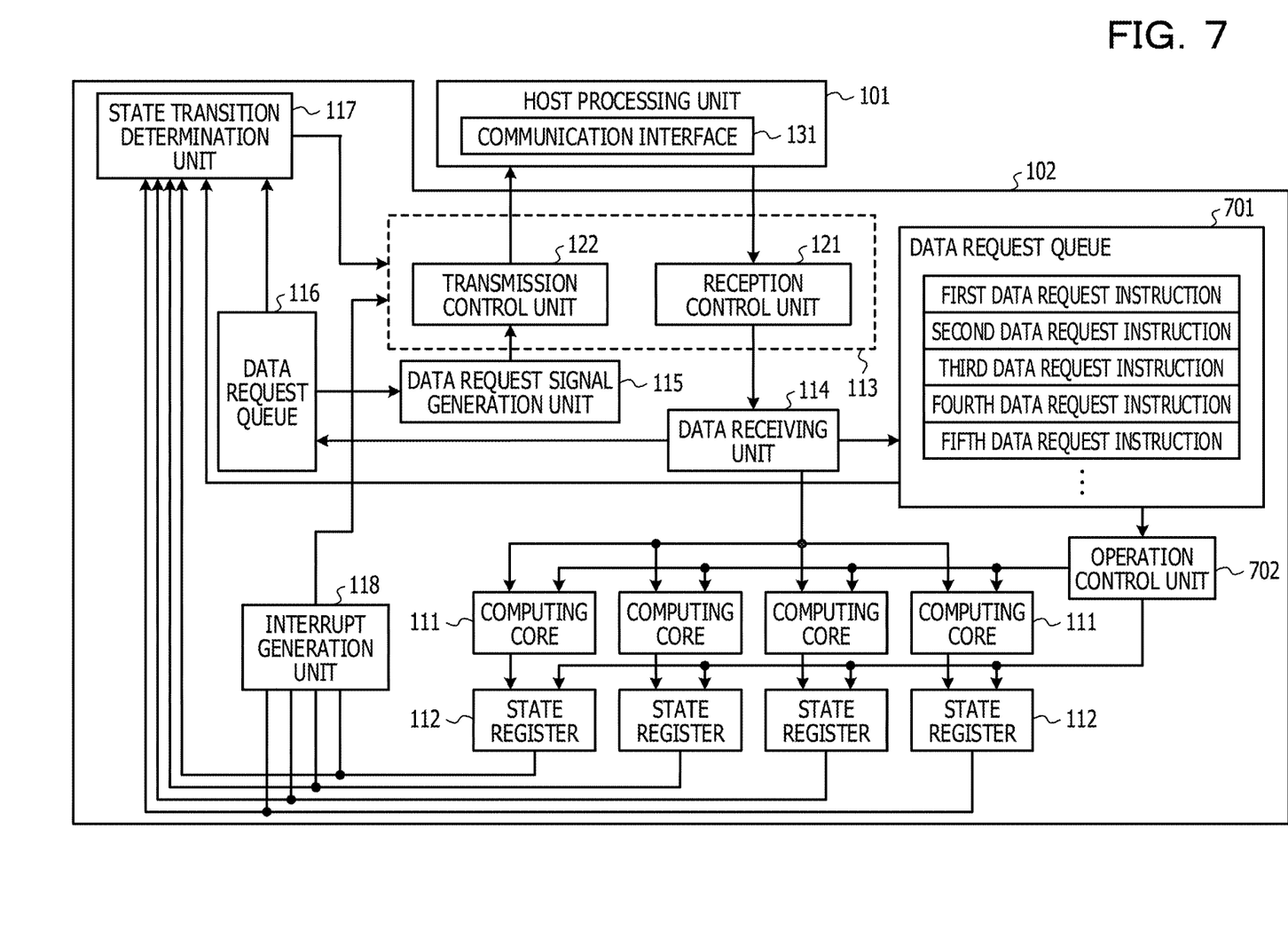
FIG. 7 illustrates an example of an information processing apparatus.

FIG. 7 illustrates an example of an information processing apparatus. The information processing apparatus in FIG. 7 has a configuration in which an operation instruction queue 701 and an operation control unit 702 are added to the information processing apparatus in FIG. 1. Differences of the present embodiment from the foregoing embodiment will be described below. The processing unit 102 includes the operation instruction queue 701 and the operation control unit 702.

In the same manner as in FIG. 1, upon receiving a packet of a data request completion notification from the transmission control unit 122 by way of the communication interface 131, the host processing unit 101 transmits a packet of an operation instruction corresponding to the data request completion notification to the reception control unit 121 of the processing unit 102.

The reception control unit 121 receives the operation instruction packet from the host processing unit 101 and outputs a signal of the operation instruction to the data receiving unit 114. The data receiving unit 114 receives the operation instruction signal output by the reception control unit 121 and stores the operation instruction as an entry of the operation instruction queue 701.

In a similar manner, the host processing unit 101 may sequentially transmit a plurality of operation instruction packets. The data receiving unit 114 sequentially stores operation instructions as a plurality of entries of the operation instruction queue 701 in accordance with the operation instruction packets received by the reception control unit 121. The operation instruction queue 701 stores operation instructions in a fast-in fast-out manner.

The operation control unit 702 reads an operation instruction in the entry at the head of the operation instruction queue 701 and outputs an operation instruction to the computing core 111 corresponding to the operation of the read operation instruction. Upon receiving the operation instruction, the computing core 111 starts performing an operation by using the received data mentioned above. In addition, upon starting performing an operation, the computing core 111 sets the valid bit 201 of the state register 112 corresponding to itself to one. Note that the operation control unit 702 may perform writing to the state resister 112.

Figure 8:
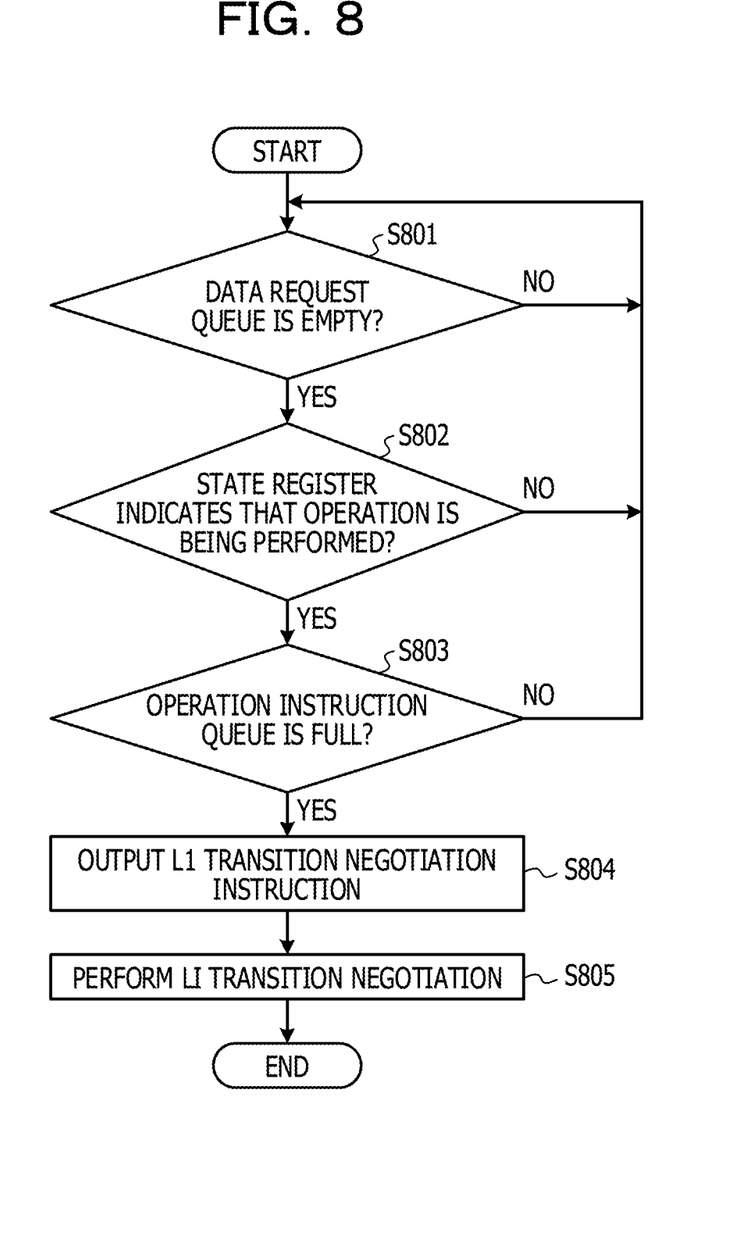
FIG. 8 illustrates an example of a method for controlling a processing unit.

FIG. 8 illustrates an example of a method for controlling a processing unit. The flowchart in FIG. 8 is a flowchart in which operation S803 is added to the process of the flowchart in FIG. 3.

In operation S801, the state transition determination unit 117 determines whether there is no entry in the data request queue 116. If the state transition determination unit 117 determines that there is no entry in the data request queue 116, the process proceeds to operation S802. If the state transition determination unit 117 determines that there is any entry in the data request queue 116, the reception control unit 121 has to wait for the reception control unit 121 to receive packets of data and therefore maintains the normal state L0 of the physical layer of the communication interface 113, and the process returns to operation S801.

In operation S802, the state transition determination unit 117 refers to the state register 112 and determines whether at least one computing core 111, out of one or a plurality of computing cores 111 corresponding to the operation of the operation instruction mentioned above, is performing the operation. If the state transition determination unit 117 determines that the at least one computing core 111 mentioned above is performing the operation, the process proceeds to operation S803. If the state transition determination unit 117 determines that no one of the computing cores 111 mentioned above is performing an operation, the state transition determination unit 117 has to wait for the reception control unit 121 to receive packets of an operation instruction and therefore maintains the normal state L0 of the physical layer of the communication interface 113, and the process returns to operation S801.

In operation S803, the state transition determination unit 117 determines whether the operation instruction queue 701 is full, that is, whether all of the one or more entries in the operation instruction queue 701 are in use. The host processing unit 101 knows the number of entries of the operation instruction queue 701 and is able to determine whether all of the entries in the operation instruction queue 701 are in use. When all of the entries in the operation instruction queue 701 are in use, the host processing unit 101 does not transmit packets of a new data request instruction and waits until all of the entries in the operation instruction queue 701 become not in use. During this waiting time, communication is not performed, and therefore the state transition determination unit 117 may cause the physical layer of the communication interface 113 to transition from the normal state L0 to the power-saving state L1. If the state transition determination unit 117 determines that all of the entries in the operation instruction queue 701 are in use, the process proceeds to operation S804. If the state transition determination unit 117 determines that all of the entries in the operation instruction queue 701 are not in use, there is a possibility that the reception control unit 121 will receive packets of a data request instruction, and therefore the state transition determination unit 117 maintains the normal state L0 of the physical layer of the communication interface 113, and the process returns to operation S801.

In operation S804, the state transition determination unit 117 outputs a power-saving state L1 transition negotiation instruction to the communication interface 113. The power-saving state L1 transition negotiation instruction is an instruction signal for causing the physical layer of the communication interface 113 to transition from the normal state L0 to the power-saving state L1.

In operation S805, upon receiving the power-saving state L1 transition negotiation instruction output by the state transition determination unit 117, the transmission control unit 122 transmits packets of the power-saving state L1 transition negotiation to the communication interface 131 of the host processing unit 101. When there is no schedule for communication, the host processing unit 101 determines that the physical layer of the communication interface 131 may enter the power-saving state L1, and transmits the power-saving state L1 transition negotiation packets to the communication interface 113 of the processing unit 102 by way of the communication interface 131. Upon receiving the power-saving state L1 transition negotiation response packets transmitted by the host processing unit 101, the communication interface 113 causes the physical layer of the communication interface 113 from the normal state L0 to the power-saving state L1. In a similar manner, the communication interface 131 causes the physical layer of the communication interface 131 to transition from the normal state L0 to the power-saving state L1.

Figure 9A:
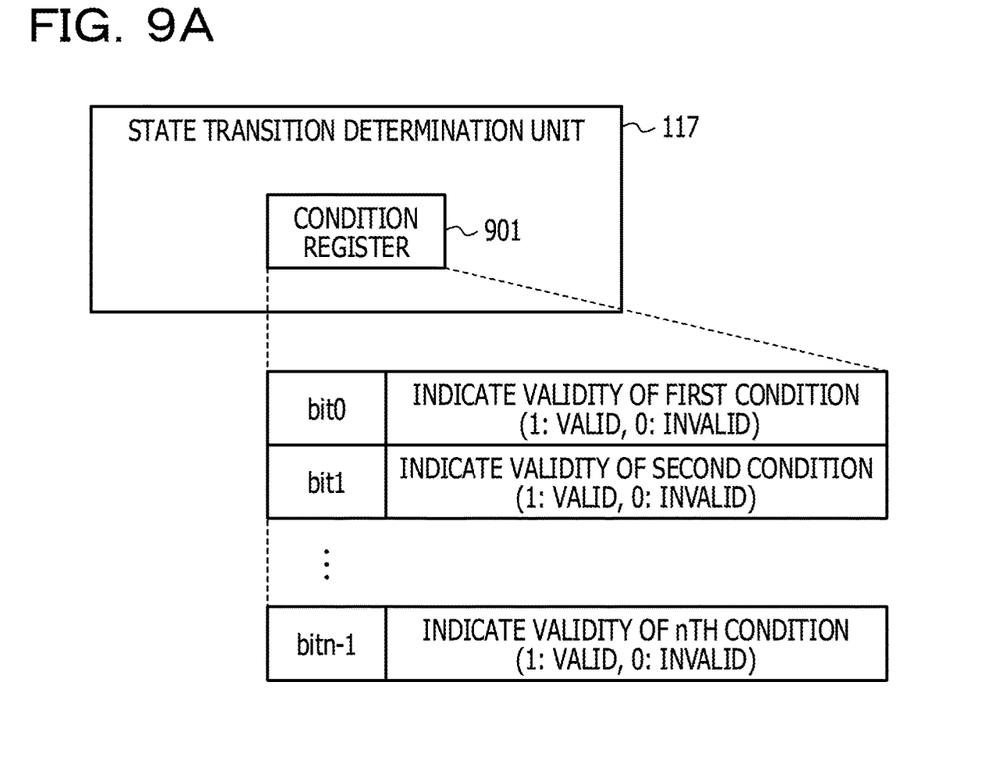
FIG. 9A illustrates an example of a state transition determination unit.
Figure 9B:
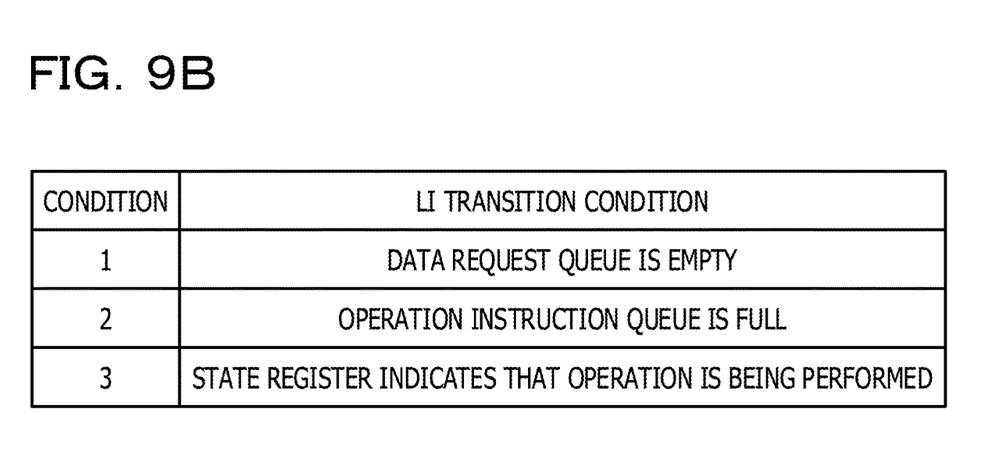
FIG. 9B illustrates an example of first to third conditions stored in a condition register.

FIG. 9A illustrates an example of a state transition determination unit. With reference to FIGS. 9A and 9B, differences from the foregoing embodiments will be described below. The state transition determination unit 117 includes a condition register 901. The validities of a plurality of conditions are respectively stored in a plurality of bits of the condition register 901. A bit value of one indicates that the condition is valid, and a bit value of zero indicates that the condition is invalid. The state transition determination unit 117 is capable of setting each bit value of the condition register 901.

FIG. 9B illustrates an example of first to third conditions stored in a condition register. The first condition is a condition for determination in operation S301 in FIG. 3 and in operation S801 in FIG. 8 and is a condition stating that the data request queue 116 is empty. The second condition is a condition for determination in operation S803 in FIG. 8 and is a condition stating that the operation instruction queue 701 is full. The third condition is a condition for determination in operation S302 in FIG. 3 and in operation S802 in FIG. 8 and is a condition stating that at least one computing core 111, out of one or a plurality of computing cores 111 corresponding to the operation of an operation instruction, is performing the operation.

When the condition register 901 stores therein a value in which the first and third conditions are valid and the second condition is invalid, the state transition determination unit 117 performs the process illustrated in FIG. 3. When the condition register 901 stores therein a value in which the first to third conditions are valid, the state transition determination unit 117 performs the process illustrated in FIG. 8. In this way, the state transition determination unit 117 may perform the process illustrated in FIG. 3 or the process illustrated in FIG. 8 in accordance with a value set in the condition register 901.

As described above, when communication is not performed, the state transition determination unit 117 causes the physical layer of the communication interface 113 to transition from the normal state L0 to the power-saving state L1 at an early stage, thereby reducing power consumption. When communication is performed, the state transition determination unit 117 causes the physical layer of the communication interface 113 to transition from the power-saving state L1 to the normal state L0 at an early stage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
   a communication interface configured to transmit a data request corresponding to a data request instruction stored in a data request queue that stores the data request instruction as an entry and to receive data corresponding to the transmitted data request and an operation instruction; and
   a processor including a plurality of computing cores configured to perform an operation by using the data received by the communication interface,
   the processor is configured to:
      determine whether there is no entry in the data request queue;
      determine, when determining that there is no entry in the data request queue, whether one or more computing cores, which is to execute the operation instruction, are during execution by refereeing to a plurality of memories which are provided for the respective computing cores and store information indicating whether the respective computing cores are during execution; and
      cause the communication interface to transition to a power-saving state when at least one of the one or more computing cores are during execution.

2. The arithmetic processing device according to claim 1, wherein the processor is configured to start performing the operation in accordance with the operation instruction stored in an operation instruction queue which stores one or more operation instructions as one or more entries, respectively.

3. The arithmetic processing device according to claim 2, wherein the processor is configured to cause the communication interface to transition to the power-saving state when there is no entry in the data request queue, the at least one of the one or more computing cores are during execution and all of the one or more entries in the operation instruction queue are in use.

4. The arithmetic processing device according to claim 3, wherein the processor is configured to:
   if a condition register configured to store a first value or a second value stores the first value, cause the communication interface to transition to the power-saving state when there is no entry in the data request queue and the at least one of the one or more computing cores are during execution, and
   if the condition register stores the second value, cause the communication interface to transition to the power-saving state when there is no entry in the data request queue, the at least one of the one or more computing cores are during execution and all of the one or more entries in the operation instruction queue are in use.

5. The arithmetic processing device according to claim 1, wherein the processor is configured to cause the communication interface to transition, from the power-saving state, to a normal state when completing the operation.

6. The arithmetic processing device according to claim 5, wherein the processor is configured to cause the communication interface to transition, from the power-saving state via a recovery state, to the normal state when completing the operation.

7. The arithmetic processing device according to claim 1, wherein the processor is configured to:
   perform each of one or more operations in response to one operation instruction, and
   cause the communication interface to transition to the power-saving state when the data request queue includes no entry and the processor performs the one or more operations based on the one operation instruction.

8. The arithmetic processing device according to claim 5, wherein the processor is configured to:
   perform each of one or more operations in response to one operation instruction, and
   cause the communication interface to transition from the power-saving state to the normal state when completing an execution of all of the one or more operations based on the one operation instruction.

9. The arithmetic processing device according to claim 1, wherein the processor is configured to, when the communication interface receives the data corresponding to the transmitted data request, delete the data request instruction corresponding to the received data from the data request queue.

10. The arithmetic processing device according to claim 9, wherein the processor is configured to, when the communication interface receives a data request instruction, store the received data request instruction as an entry in the data request queue.

11. The arithmetic processing device according to claim 5, wherein the communication interface is configured to transmit an operation completion notification to outside after the operation is completed and the communication interface transitions to the normal state.

12. The arithmetic processing device according to claim 1, wherein the processor is configured to cause a physical layer of the communication interface to transition to the power-saving state.

13. The arithmetic processing device according to claim 1, wherein the communication interface is configured to, when the processor causes the communication interface to transition to the power-saving state, transmit a negotiation instruction to negotiate transition to the power-saving state and transition to the power-saving state when receiving a negotiation response corresponding to the negotiation instruction.

14. The arithmetic processing device according to claim 1, wherein the communication interface is configured to, when the processor causes the communication interface to transition to the power-saving state, transmit a negotiation instruction to negotiate transition to the power-saving state and causes a physical layer of the communication interface to the power-saving state when receiving a negotiation response corresponding to the transmitted negotiation instruction.

15. The arithmetic processing device according to claim 5, wherein the communication interface is configured to, when the processor causes the communication interface to transition to the normal state, transition from the power-saving state to a recovery state, transmit and receive an ordered set used for training, and transition from the recovery state to the normal state after the transmitting and receiving of the ordered set used for training.

16. The arithmetic processing device according to claim 5, wherein the communication interface is configured to, when the processor causes the communication interface to transition to the normal state, cause a physical layer of the communication interface to transition from the power-saving state to a recovery state, transmit and receive an ordered set for training, and cause the physical layer of the communication interface to transition from the recovery state to the normal state after transmitting and receiving the ordered set for training.

17. An information processing apparatus comprising:
an arithmetic processing device; and a host processing device coupled to the arithmetic processing device, the arithmetic processing device includes;
a communication interface configured to transmit a data request corresponding to a data request instruction stored in a data request queue that stores the data request instruction as an entry and to receive data corresponding to the transmitted data request and an operation instruction; and
a processor including a plurality of computing cores configured to perform an operation by using the data received by the communication interface,
the processor is configured to:
determine whether there is no entry in the data request queue;
determine, when determining that there is no entry in the data request queue, whether one or more computing cores, which is to execute the operation instruction, are during execution by refereeing to a plurality of memories which are provided for the respective computing cores and store information indicating whether the respective computing cores are during execution; and
cause the communication interface to transition to a power-saving state when at least one of the one or more computing cores are during execution.

18. A method of controlling an arithmetic processing device comprising:
transmitting, by a communication interface provided in the arithmetic processing device, a data request corresponding to a data request instruction stored in a data request queue that stores the data request instruction as an entry;
receiving data corresponding to the transmitted data request and an operation instruction;
performing, by a processor including a plurality of computing cores and provided in the arithmetic processing device, an operation by using the data received by the communication interface;
determining whether there is no entry in the data request queue;
determining, when determining that there is no entry in the data request queue, whether one or more computing cores, which is to execute the operation instruction, are during execution by refereeing to a plurality of memories which are provided for the respective computing cores and store information indicating whether the respective computing cores are during execution; and
causing, by the processor, the communication interface to transition to a power-saving state when at least one of the one or more computing cores are during execution.

* * * * *